US008749653B2

(12) United States Patent
Kim (10) Patent No.: US 8,749,653 B2
(45) Date of Patent: Jun. 10, 2014

(54) APPARATUS AND METHOD OF BLURRING BACKGROUND OF IMAGE IN DIGITAL IMAGE PROCESSING DEVICE

(75) Inventor: Young-geol Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 749 days.

(21) Appl. No.: 12/387,291

(22) Filed: Apr. 30, 2009

(65) Prior Publication Data

US 2009/0284613 A1 Nov. 19, 2009

(30) Foreign Application Priority Data

May 19, 2008 (KR) ........................ 10-2008-0046286

(51) Int. Cl.
*H04N 5/228* (2006.01)
*H04N 5/232* (2006.01)

(52) U.S. Cl.
USPC ........................................ 348/222.1; 348/345

(58) Field of Classification Search
USPC ........... 348/255, 222.1, 218.1, 371, 362, 345, 348/207.99, 55, 220.1, 221.1, 229.1, 216.1, 348/217.1, 23.9
See application file for complete search history.

(56) References Cited

U.S. PATENT DOCUMENTS 7,469,071 B2 * 12/2008 Drimbarean et al. ......... 382/254
7,692,696 B2 * 4/2010 Steinberg et al. ............. 348/239
7,715,643 B2 * 5/2010 Kondo et al. ................. 382/254
2002/0191100 A1 12/2002 Matsunaga et al.
2007/0147820 A1 * 6/2007 Steinberg et al. ............. 396/155
2009/0160963 A1 6/2009 Kim

FOREIGN PATENT DOCUMENTS

CN 1392724 A 1/2003

OTHER PUBLICATIONS

Office Action established for CN 200910203511.2 (Aug. 3, 2012).
Office Action issued for KR 10-2008-0046286 (Feb. 27, 2014).

* cited by examiner

*Primary Examiner* — Ahmed A Berhan
(74) *Attorney, Agent, or Firm* — Drinker Biddle & Reath LLP (57) ABSTRACT

A digital image processor and a method, specifically, an apparatus for blurring a background of an image in a digital image processor is provided wherein an image is photographed with a flash being on and off when a shutter input signal is received once, the background of the image is blurred through comparison between an image prior to the shutter input signal being received and an image during which a flash is activated, and then a subject of the image with a flash being off is combined with the blurred background. A processor blurs an image generated by a brightness difference between a first image generated before a shutter input signal is received and a second image generated with the flash being on after the shutter input signal is received and combining a third image generated by turning off the flash after the shutter input signal, to the blurred image.

18 Claims, 8 Drawing Sheets

(t-1) FRAME

FIG. 5B

(t) FRAME

FIG. 5C

(t+1) FRAME

FIG. 5D

F1 FRAME = {(t FRAME) - (t-1 FRAME)}

FIG. 5E

F2 FRAME={(t+1 FRAME) − (F1 FRAME)} IS INVERTED

FIG. 5F

F3 FRAME (BLURRING IS APPLIED TO BACKGROUND)

FIG. 5G

F3 FRAME (BLURRING IS MORE APPLIED TO BACKGROUND THAN FIG. 5F)

APPARATUS AND METHOD OF BLURRING BACKGROUND OF IMAGE IN DIGITAL IMAGE PROCESSING DEVICE

CROSS-REFERENCE TO RELATED PATENT APPLICATION

This application claims the benefit of Korean Patent Application No. 10-2008-0046286, filed on May 19, 2008, in the Korean Intellectual Property Office, the disclosure of which is incorporated herein in its entirety by reference.

BACKGROUND OF THE INVENTION

1. Field of the Invention

The present invention relates to a digital image processing device and a method thereof, and more particularly, to an apparatus for blurring a background of an image in a digital image processing device in which an image is photographed with a flash being on and off when a shutter input signal is received one time, the background of the image is blurred through comparison between an image prior to a shutter input and an image during which a flash is active, and then a subject of the image with a flash being off is combined with the blurred background, and a method thereof.

2. Description of the Related Art

Currently popularized digital image processing devices such as digital cameras, camera phones, and smart phones include various kinds of digital devices and process digitalized data, thereby providing functions that are distinguished from analog photographing equipments.

For example, a large amount of memory is purchased to store a large number of images, compared with a conventional film, and a charge coupled device (CCD) replaces film so as to realize high definition images, thereby permitting a sharing of image data with a personal computer (PC) and facilitating image processing.

In addition, more functions, such as automatic control of shutter speed and aperture values, auto focus, image enhancement, and automatic light quantity control, are provided in digital image processing devices than in analog photographing equipment.

However, analog photographing equipment uses natural optical materials and is hand-operated and thus may be preferred, compared to digital image processing devices, when a higher sensitivity is needed.

Accordingly, recently introduced digital image processing devices have the advantages of digital devices along with the functions of conventional analog image processing devices added thereto. That is, advantages of analog devices are added to these recently introduced digital devices, thereby providing various specialized functions beyond the limitations of digital devices.

In addition, due to the wide availability of digital image processing devices, the popularity of photographing has gradually increased and thus the numbers of people who have acquired professional photographing techniques has also increased.

However, such digital image processing devices cannot satisfy the demands of professional users.

For example, when photographing a person, blurring effect (out of focus effect) is mostly used related to using a shallow depth-of-field. However, when an existing digital image processing device is used, such an effect can hardly be noticed due to the limited size of the lens and CCD.

In general, the blurring effect varies according to a size of a circle of confusion (when one point of a subject forms an image through a lens, the image is formed by a circle of points having a size to be seen as points and a predetermined diameter. For large diameters of such circles, the image is seen as being "out of focus" by a human eye. Here, the circle point having a diameter is denoted as the circle of confusion) and the size of the circle of confusion is closely related to depth (the depth of a focus and depth of field).

Thus, the depth varies according to factors such as the size of CCD, aperture values, focal length of a lens, distance between a subject and a camera, and distance between a subject and a background.

Among factors determining the depth described above, an image sensor, aperture values, and focal length of a lens, and excluding the distance between a subject and the digital image processing device, considerably change according to physical specifications of the digital image processing device. According to characteristics of miniaturized digital image processing devices, only a high depth of field can be formed due to small image sensor and small aperture lens, thereby not satisfying the demands of a user who desires a small depth of field through which only the main subject is clear and the background is blurred.

In addition, when a large-sized sensor and lens are employed in a digital image processing device, it affects a yield of a semiconductor process for manufacturing relatively large image sensors and a special design for the large aperture lens is required, thereby increasing a manufacture cost. Also, a size of the digital image processing device increases and also miniaturization of such a digital image processing device is limited.

SUMMARY

Various embodiments of the present invention provide an apparatus for blurring a background of an image in a digital image processing device in which an image is photographed with a flash being on and off when a shutter input signal is received one time, the background of the image is blurred through comparison between an image prior to a shutter input and an image at which a flash is emitted, and then a subject of the image with a flash being off is combined with the blurred background, and a method thereof.

According to an aspect of the present invention, there is provided an apparatus for blurring a background of an image in a digital image processing device, the apparatus including: a digital signal processor blurring an image generated by a difference in brightness between a first image generated before a shutter input signal is received and a second image generated with the flash being on after the shutter input signal is received and combining a third image generated when the flash is turned off after the shutter input signal is received, to the blurred image.

The first image may be generated after a first input signal is received via a shutter-release button and immediately before a second input signal is received via the shutter-release button.

The second image photographed with the flash being on and the third image photographed with the flash being off may be generated together when the second input signal is received one time via the shutter-release button.

The digital signal processor may include: a comparing unit comparing the difference in brightness information between the first image and the second image to generate a fourth image in which the difference in brightness information is generated and comparing the difference in brightness information between the third image and the fourth image to generate a fifth image in which the difference in brightness information is generated; an inversion unit inverting the brightness information of the fifth image; a blurring unit blurring the inverted fifth image by using a low pass filter; and a combining unit combining the subject of the third image to the blurred fifth image.

The digital signal processor may further include a buffer storing the first through fifth images therein in a first in first out form.

The digital signal processor may further include a flash controller controlling on and off states of the flash in order to photograph the first and second images when the second input signal is received via the shutter-release button.

The inversion unit may separate a subject region and a background region from the fifth image.

The blurring unit may mask the subject region separated from the fifth image.

According to another aspect of the present invention, there is provided an apparatus for blurring a background of an image in a digital image processing device, the apparatus including: a buffer storing first, second, and third images therein, the first image being generated after a first input signal is received via the shutter-release button and before a second input signal is received via the shutter-release button, the second image being photographed with a flash being on when the second input signal is received one time via the shutter-release button, and the third image being photographed with the flash being off; a comparing unit comparing the difference in brightness information between the first image and the second image to generate a fourth image in which the difference in brightness information is generated and comparing the difference in brightness information between the third image and the fourth image to generate a fifth image in which the difference in brightness information is generated; an inversion unit inverting the brightness information of the fifth image; a blurring unit blurring the inverted fifth image by using a low pass filter; and a combining unit combining the subject of the third image to the blurred fifth image.

The buffer may store the fourth and fifth images, in addition to the first through third images, in a first in first out form.

The apparatus may further include a flash controller controlling on and off of the flash in order to photograph the first and second images when second inputting the shutter-release button.

According to another aspect of the present invention, there is provided a method of blurring a background of an image in a digital image processing device, the method including: (a) generating first image generated before a shutter input signal is received, a second image photographed with a flash being on when a shutter input signal is received one time, and a third image photographed with the flash being off; (b) blurring an image generated by the difference in brightness between the first image and the second image; and (c) combining the subject of the third image to the blurred image.

The first image may be generated after a first input signal is received via a shutter-release button and immediately before a second input signal is received via the shutter-release button and the second and third images may be generated with the flash being respectively on and off after the second input signal is received via the shutter-release button.

Operation (b) may include: (b-1) comparing the difference in brightness information between the first image and the second image to generate a fourth image in which the difference in brightness information is generated; (b-2) comparing the difference in brightness information between the third image and the fourth image to generate a fifth image in which the difference in brightness information is generated; (b-3) inverting the brightness information of the fifth image; and (b-4) blurring the fifth image, in which the brightness information is inverted, by using a low pass filter.

The method may further include separating a subject region and a background region from the fifth image after (b-3).

Operation (b-4) may further include masking the subject region separated from the fifth image in which the brightness information is inverted and applying a low pass filter to the separated background region.

According to another aspect of the present invention, there is provided a method of blurring a background of an image in a digital image processing device, the method including: (a) generating first, second, and third images in the digital image processing device, the first image being generated after a first input signal is received via the shutter-release button and before a second input signal is received via the shutter-release button, the second image being photographed with a flash being on when the second input signal is received one time via the shutter-release button, and the third image being photographed with the flash being off; (b) comparing the difference in brightness information between the first image and the second image to generate a fourth image in which the difference in brightness information is generated; (c) comparing the difference in brightness information between the third image and the fourth image to generate a fifth image in which the difference in brightness information is generated and inverting the brightness information of the fifth image; (d) separating a subject region and a background region from the fifth image in which the brightness information is inverted and blurring the separated background region by low pass filtering the background region; and (e) combining the subject of the third image to the blurred fifth image.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Hereinafter, the present invention will be described more fully with reference to the accompanying drawings, in which exemplary embodiments of the invention are shown and described below.

Figure 1:
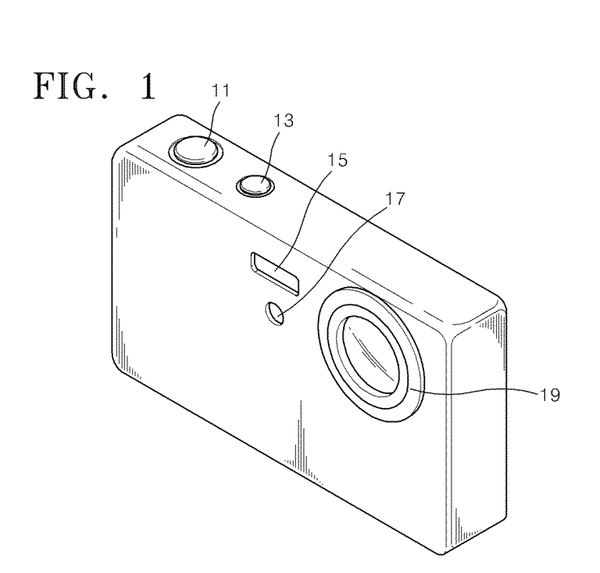
FIG. 1 is a perspective view illustrating a front and upper part of an external portion of a digital image processing device.

FIG. 1 is a perspective view illustrating a front and upper part of an external portion of a digital image processing device.

A shutter-release button 11 is pressed to expose a charge coupled device (CCD) or a film to light for a predetermined time and is connected with an aperture (not shown) to properly expose a subject, thereby recording an image to the CCD.

The shutter-release button 11 generates first and second image photographing signals based on the input of a photographer. When the shutter-release button 11 is pressed into a first input state (in a "half-pressed" state), the digital image processing device tries to focus on a subject of a to-be-formed image and adjusts light quantity. Here, when the digital image processing device focuses on the subject, a green light is turned on in a display unit 23. When the subject is focused and light quantity is adjusted in the first input state of the shutter-release button 11, the shutter-release button 11 is pressed into a second input state (a fully depressed state) to generate a full-shutter signal, thereby photographing the image.

A power button 13, when pressed, allows supply of a power source to the digital image processing device and in order to operate the digital image processing device.

A flash 15 brightens up a dark place by momentarily flashing light. A flash mode includes automatic flash, Fill-in Flash, flash off, red eye reduction, and slow synchronization.

A sub-light 17 supplies light to the subject so that the digital image processing device can automatically, rapidly and accurately focus the subject when ambient light quantity is insufficient and while photographing at night time.

A lens unit 19 receives light from an external light source and processes an image.

Figure 2:
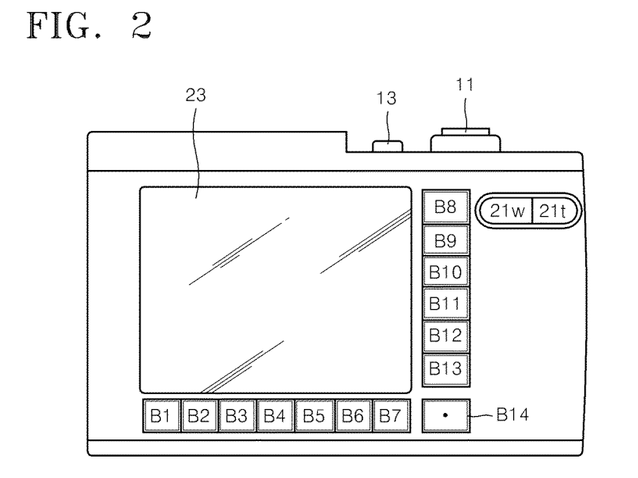
FIG. 2 is a rear view illustrating a rear external portion of the digital image processing device of FIG. 1.

FIG. 2 is a rear view illustrating a rear external portion of the digital image processing device of FIG. 1 and includes a wide angle-zoom button 21w, a telephoto-zoom button 21t, a display unit 23, and input buttons B1 through B14 (hereinafter, referred to as buttons B1-B14) including a touch sensor or a contact-point switch.

The wide angle-zoom button 21w and the telephoto-zoom button 21t respectively widen and narrow a view angle according to an input of these buttons for, in particular, changing the size of a selected exposure region. When the wide angle-zoom button 21w is activated, the size of the selected exposure region is increased and when the telephoto-zoom button 21t is activated, the size of the selected exposure region is increased.

The buttons B1-B14 are arranged along vertical and horizontal sides of the display unit 23. The buttons B1-B14 arranged along the vertical and horizontal sides of the display unit 23 include touch sensors (not shown) and/or contact-point switches (not shown).

That is, the buttons B1-B14 may include a touch sensor and are used to move up/down/left/right while touching the buttons B1-B7 in a horizontal line or the buttons B8-B14 in a vertical line so as to select chosen values (for example, color or brightness) from among main menu items or to activate lower menu icons included in main menu icons.

Also, if the buttons B1-B14 include a contact-point switch, main menu icons and lower menu icons can be directly selected to activate the corresponding functions. The touch sensor only requires relatively more delicate touch, whereas the input of the contact-point switch requires a relatively firmer touch.

Figure 3:
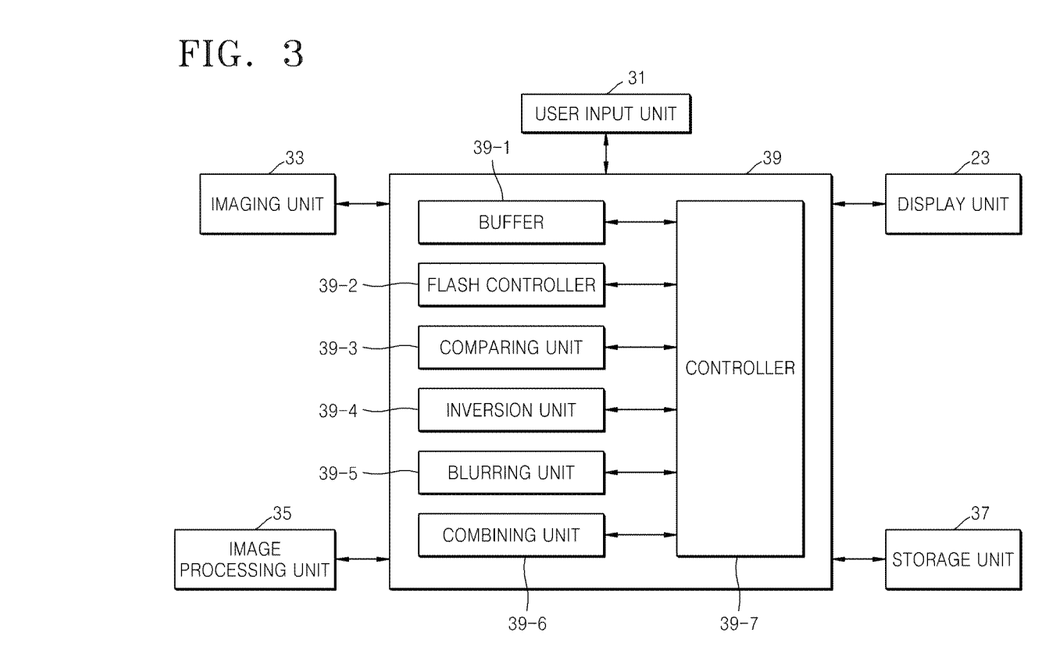
FIG. 3 is a block diagram of an apparatus for blurring a background of an image in a digital image processing device according to an embodiment of the present invention.

FIG. 3 is a block diagram of an apparatus for blurring a background of an image in a digital image processing device according to an embodiment of the present invention. The apparatus includes a display unit 23, a user input unit 31, an imaging unit 33, an image processing unit 35, a storage unit 37, and a digital signal processing unit 39.

The user input unit 31 includes the shutter-release button 11, the power button 13, the wide angle-zoom button 21w and the telephoto-zoom button 21t, and the buttons B1-B14.

The image unit 33 includes a shutter that is not shown in the drawing, a lens unit, an aperture, a CCD, and an analog to digital converter (ADC). The shutter adjusts the quantity of exposure light along with the aperture. The lens unit processes an image by receiving light from an external light source. Here, the aperture adjusts a light quantity that is incident to the CCD according to the degree of opening and closing of the aperture. The degree of opening and closing of the aperture is controlled by the digital signal processing unit 39.

The CCD accumulates light input through the lens unit and outputs the image that is imaged in the lens unit according to the quantity of light accumulated in compliance with a vertical synchronizing signal. The digital image processing device obtains an image by the CCD which converts light from the subject into an electric signal. In order to obtain a color image by using the CCD, a color filter is needed and a filter called a color filter array (CFA) is mostly employed. The CFA has a regularly arranged structure through which light of one color for one pixel is passed. According to the arrangement, the CFA may be employed in various forms. The ADC converts an analog image signal output from the CCD into a digital signal.

The image processing unit 35 processes signals so as to display RAW data that is digitally converted. The image processing unit 35 removes a black level occurring due to a dark current generated in the CCD and CFA which are sensitive to temperature changes. The image processing unit 35 performs gamma correction for encoding information in compliance with nonlinearity of human vision.

The image processing unit 35 performs CFA interpolation interpolating a Bayer pattern to a RGB line, the Bayer pattern being realized by a RGRG line and a GBGB line of predetermined data that is gamma corrected. The image processing unit 35 converts the interpolated RGB signal into a YUV signal, performs edge compensation and color correction, and removes noise of the signals, wherein the edge compensation filters a Y signal using a high band filter so as to clarify the image and the color correction corrects color values of U and V signals using the standard color coordinate system. The image processing unit 35 compresses and processes Y, U, and V signals from which noise is removed, and thus generates a JPEG file. The generated JPEG file is displayed on the display unit 23 and is stored in the storage unit 37. The image processing unit 35 is operated under control of the digital signal processing unit 39.

The digital signal processing unit 39 blurs an image generated by a difference in brightness between a first image generated before shutter activation and a second image generated with the flash 15 being on after the shutter activation and combines a third image generated while the flash 15 is turned off after the shutter activation to the blurred image.

In order to do so, the digital signal processing unit 39 includes a buffer 39-1, a flash controller 39-2, a comparing unit 39-3, an inversion unit 39-4, a blurring unit 39-5, a combining unit 39-6, and a controller 39-7.

The buffer 39-1 temporarily stores therein the image frames when first and second input signals are received via the shutter-release button 11 and various image frames in which a background is blurred in a first in first out form, that is, in a form that firstly stored data is firstly output.

Figure 4:
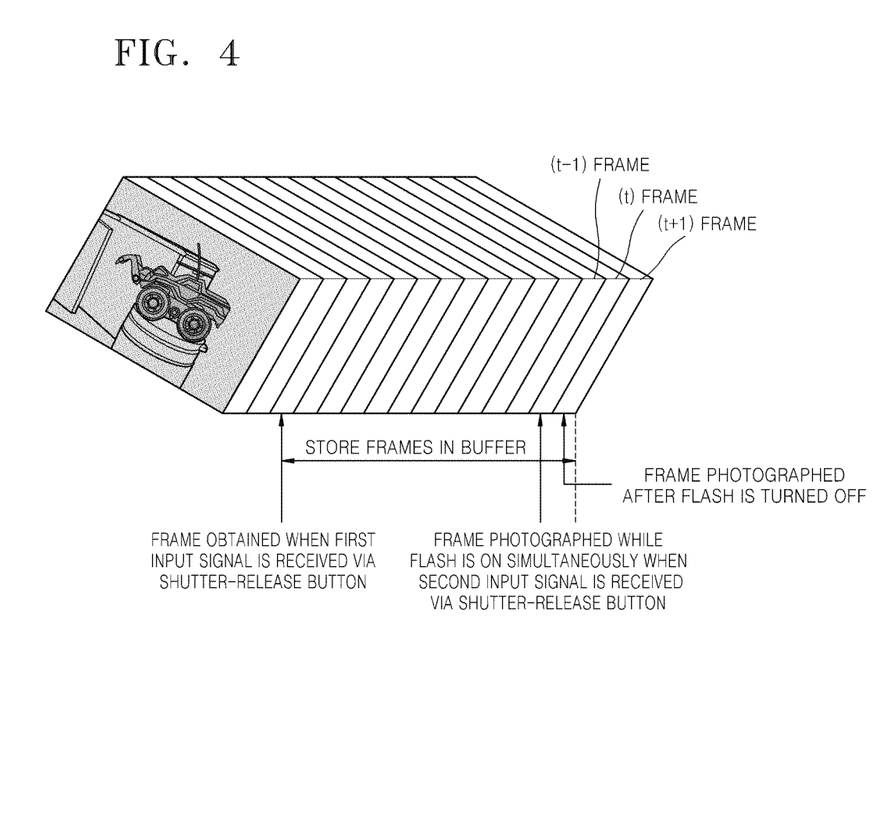
FIG. 4 illustrates image frames stored in a buffer when first and second inputting a shutter-release button in the apparatus for blurring a background of an image of FIG. 3.

FIG. 4 illustrates image frames stored in the buffer 39-1 when first and second input signals are received via the shutter-release button 11 in the apparatus for blurring a background of an image of FIG. 3. The buffer 39-1 sequentially stores the image frames when a first input signal is received via the shutter-release button 11 under control of the controller 39-7. Here, the image frames stored in the buffer 39-1 are image frames in which auto exposure (AE), auto white balance (AWB), and auto focus (AF) are performed. The image frame just prior to the second input signal being received via the shutter-release button 11 is assumed to be a (t−1) frame.

FIGS. 5A through 5G illustrate blurring a background using the image frames stored in the buffer 39-1 in the apparatus for blurring a background of an image of FIG. 3.

Figure 5A:
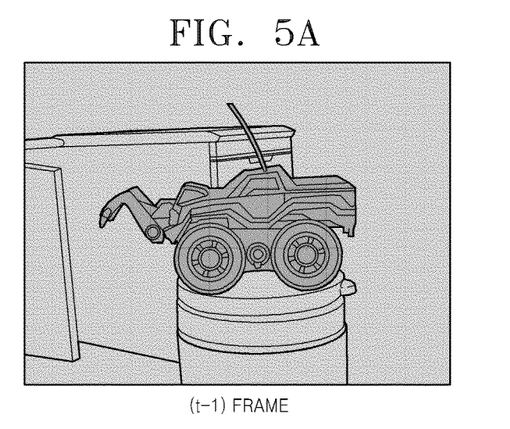
FIGS. 5A through 5G illustrate blurring a background using the image frames stored in the buffer in the apparatus for blurring a background of an image of FIG. 3.

In FIG. 5A, illustrated is a (t−1) frame image that is generated after a first input signal is received via the shutter-release button 11 and immediately before a second input signal being received via the shutter-release button 11.

Figure 5B:
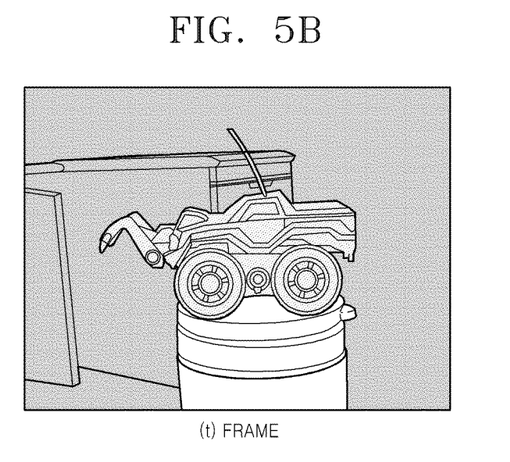
Figure 5C:
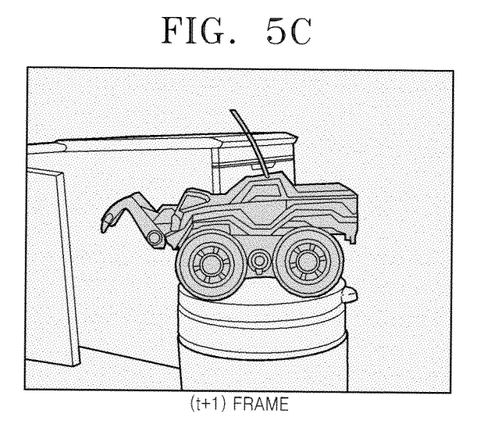

Then, when a second input signal is received via the shutter-release button 11, a (t) frame that is the image frame photographed while the flash 15 is on during shutter activation and a (t+1) frame that is the image frame photographed while the flash 15 is off are stored in the buffer 39-1.

FIGS. 5B and 5C illustrates the (t) frame image and the (t+1) frame image which are photographed when a second input signal is received one time via the shutter-release button 11.

FIG. 5B illustrates the (t) frame image photographed with the flash 15 being on when the second input signal is received via the shutter-release button 11 and FIG. 5C illustrates the (t+1) frame image photographed with the flash 15 being off when the second input signal is received via the shutter-release button 11.

In the current digital image processing device, the size of the (t−1) frame image illustrated in FIG. 5A, that is, a live view image, is smaller than the size of the (t) frame image and the (t+1) frame image illustrated in FIGS. 5B and 5C, that is, the captured images. However, according to technology development of the digital image processing device, when the size of the live view image is same as the size of the captured image, the (t+1) frame image illustrated in FIG. 5C can be replaced with the (t−1) frame image illustrated in FIG. 5A.

When the second input signal is received via the shutter-release button 11, the flash controller 39-2 emits, under control of the controller 39-7, the flash 15 so as to photograph the (t) frame image and turns off the flash 15 to photograph the (t+1) frame image.

The comparing unit 39-3 compares the difference in brightness information between the (t) frame image and the (t−1) frame image and generates a F1 image frame as a new image frame in which the difference in brightness information is generated, thereby storing the F1 image to the buffer 39-1. Here, since a reflection difference may exist in the F1 frame image dependent on the color, gain amplification may be further performed.

Figure 5D:
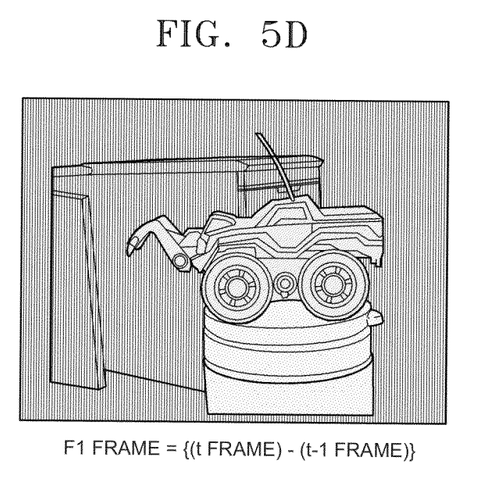

FIG. 5D illustrates the F1 frame image as the image in which the difference in brightness information is generated by comparing the (t) frame image and the (t−1) frame image.

In addition, the comparing unit 39-3 compares the difference in brightness information between the (t+1) frame image and the F1 frame image and generates a F2 frame image as a new image frame in which the difference in brightness information is generated, thereby storing the F2 frame image to the buffer 39-1.

Then, the inversion unit 39-4 inverts brightness information of the F2 frame image and separates the subject region and the background region.

Figure 5E:
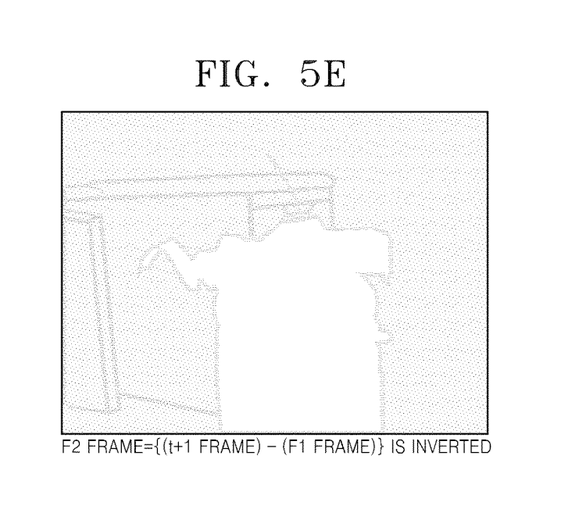

FIG. 5E illustrates the F2 frame image in which brightness information on the F2 frame image is inverted and the subject region E-1 and the background region E-2 are separated. Brightness information is inverted so that brightness information of the background region E-2 is brighter than that of the subject region E-1.

The blurring unit 39-5 blurs the F2 frame image in which brightness information is inverted by using a low pass filter (not shown). When the inverted F2 frame image passes through the low pass filter, data in a high frequency band, that is, edge data, cannot pass through the low pass filter and only data in a low frequency band passes through the low pass filter, thereby blurring the frame image. The blurring unit 39-5 can apply a different weighting to the low pass filter so as to control the amount of blurring.

In addition, the blurring unit 39-5 masks the subject region e-1 of the F2 frame image in which brightness information is inverted, imposes a weighting on a part except for the masked part, that is, the background region e-2, applies the low pass filter, and maximizes the effect of separating the subject and background.

The combining unit 39-6 combines the subject of the (t+1) frame image to the subject region e-1 of the F2 frame image that is blurred, thereby generating the final F3 frame image.

Figure 5F:
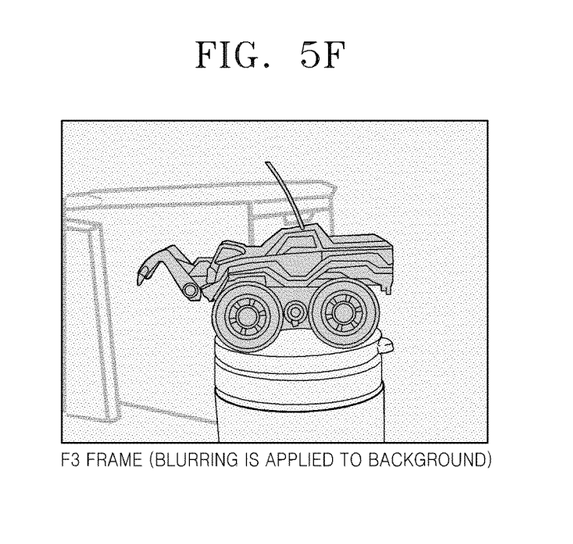
Figure 5G:
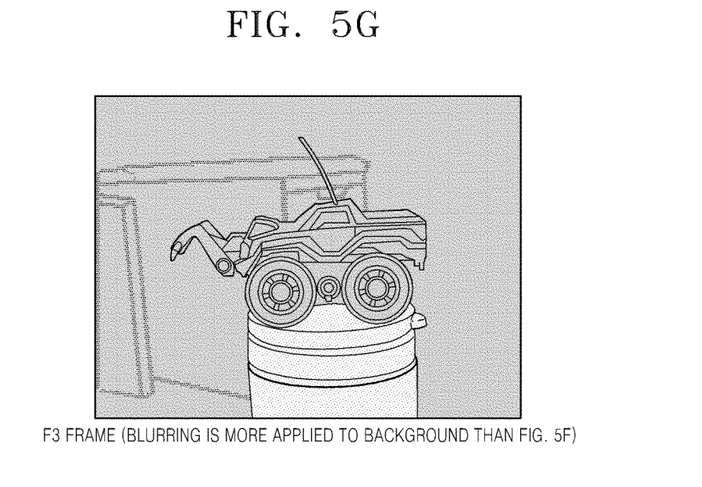

FIGS. 5F and 5G illustrate the final F3 frame image in which the subject of the (t+1) frame image is combined to the subject region e-1 of the F2 frame image that is blurred.

Here, more blurring is applied to FIG. 5F than to FIG. 5G. Applying more or less blurring can vary according to the application of weighting of the low pass filter.

In the embodiments of the present invention, the flash 15 is activated while in a live view state so that information about the subject and background is obtained and blurring is applied. However, in another embodiment, a voluntary light emitting device, for example, an infrared device, which does not recognize an image at the same wavelengths as people, or a separate light emitting device which recognizes an image imaged on the CCD, can replace the flash 15.

Figure 6:
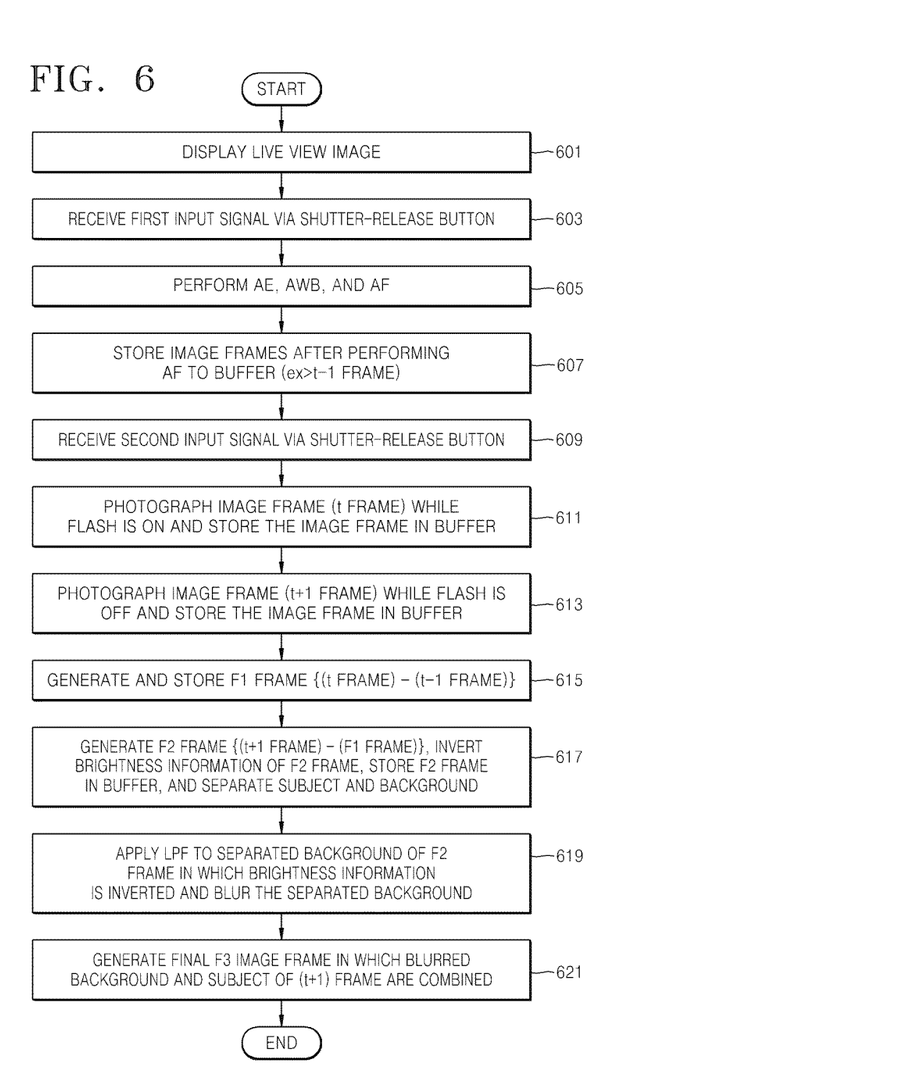
FIG. 6 is a flowchart illustrating a method of blurring a background of an image in a digital image processing device according to an embodiment of the present invention.

Hereinafter, a method of blurring a background of an image in a digital image processing device is described in more detail with reference to FIG. 6. The method of blurring a background of an image in a digital image processing device can be executed in the digital signal processing unit 39 as illustrated in FIG. 3.

In a photographing mode while the digital image processing device is turned on, the digital signal processing unit 39 displays a live view image on the display unit 23, in operation 601.

The digital signal processing unit 39 receives a first input signal from a user via the shutter-release button 11, while the live view image is displayed, in operation 603. Then the digital signal processing unit 39 performs AE, AWB, and AF with respect to the live view image, in operation 605.

The digital signal processing unit 39 stores the images after AF is performed in the buffer 39-1 included therein, in operation 607.

The buffer 39-1 has a first in first out form, that is, a form in which firstly stored data is firstly output. FIG. 4 illustrates the image frames sequentially stored in the buffer 39-1 when the first input signal is received via the shutter-release button 11. It is assumed that the image frame just prior to the second input signal received via the shutter-release button 11 is the (t−1) frame. In FIG. 5A, the first input signal is received via the shutter-release button 11 and the (t−1) frame image that is just prior to the second input signal received via the shutter-release button 11 is illustrated.

Then, when the digital signal processing unit 39 receives the second input signal from the user via the shutter-release button 11, in operation 609, the (t) frame is stored in the buffer 39-1, in operation 611, as an image frame photographed while the flash 15 is on, and the (t+1) frame is stored in the buffer 39-1, in operation 613, as an image frame photographed while the flash 15 is off.

In the present invention, the (t) frame image obtained while the flash 15 is on and the (t+1) frame image obtained while the flash 15 is off are photographed together when the second input signal is received once via the shutter-release button 11.

FIGS. 5B and 5C illustrate the (t) frame image and the (t+1) frame image that are photographed when the second input signal is received once via the shutter-release button 11. FIG. 5B illustrates the (t) frame image photographed while the flash 15 is on when the second input signal is received via the shutter-release button 11 and FIG. 5C illustrates the (t+1) frame image photographed while the flash 15 is off when the second input signal is received via the shutter-release button 11.

Then, the digital signal processing unit 39 compares the difference in brightness information between the (t) frame image and the (t−1) frame image and generates a F1 image frame as a new image frame in which the difference in brightness information is generated, thereby storing the F1 image to the buffer 39-1, in operation 615.

Here, since a reflection difference may exist in the F1 frame image dependant on color, gain amplification may be further performed. FIG. 5D illustrates the F1 frame image as the image in which the difference in brightness information is generated by comparing the (t) frame image and the (t−1) frame image.

Then, the digital signal processing unit 39 compares the difference in brightness information between the (t+1) frame image and the F1 frame image and generates a F2 frame image as a new image frame in which the difference in brightness information is generated. Then, brightness information of the F2 frame image is inverted to store the inverted brightness information in the buffer 39-1, in operation 617. Here, digital signal processing unit separates the subject region e-1 and the background region e-2 of the F2 frame in which brightness information is inverted.

FIG. 5E illustrates the F2 frame image in which brightness information on the F2 frame image is inverted and the separated subject region E-1 and the background region E-2. Brightness information is inverted so that brightness information of the background region E-2 is brighter than that of the subject region E-1.

The digital signal processing unit 39 blurs the F2 frame image in which brightness information is inverted by using a low pass filter (not shown), in operation 619.

When the inverted F2 frame image passes through the low pass filter, data in a high frequency band, that is, edge data, cannot pass through the low pass filter and only data in a low frequency band passes through the low pass filter, thereby blurring the frame image.

The blurring unit 39-5 applies different weightings to the low pass filter so as to control the amount of blurring. In addition, the blurring unit 39-5 masks the subject region e-1 of the F2 frame image in which brightness information is inverted, imposes weight on a part except for the masked part, that is, the background region e-2, applies the low pass filter, and maximizes the effect of separating the subject and background.

The digital signal processing unit 39 combines the subject of the (t+1) frame image to the subject region e-1 of the F2 frame image that is blurred, thereby generating the final F3 frame image, in operation 621.

FIGS. 5F and 5G illustrate the final F3 frame image in which the subject of the (t+1) frame image is combined to the subject region e-1 of the F2 frame image that is blurred.

Here, more blurring is applied to FIG. 5F than to FIG. 5G. The applying more or less blurring can vary according to the weighting of the low pass filter.

According to various embodiments of the present invention, subject information is obtained through the flash being on and off while viewing a live view image and the subject-focused blurring is applied based on the subject information, thereby providing the optical blurring.

In addition, blurring that is desired by a user can be realized while maintaining a miniaturized digital image processing device and a relatively low cost.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

Numerous modifications and adaptations will be readily apparent to those skilled in this art without departing from the spirit and scope of the present invention.

What is claimed is:

1. An apparatus for blurring a background of an image in a digital image processing device, the apparatus comprising:
    a digital signal processor for:
        generating a first generated image generated by a difference in brightness between:
            a first image created after a first input signal is received via a shutter-release button and before a second input signal is received via the shutter-release button; and
            a second image created with the flash being on after the second input signal is received via the shutter-release button;
        creating a third image when the flash is turned off after the second input signal is received via the shutter-release button;
        generating a second generated image by generating a difference in brightness between the third image and the first generated image;
        generating an inverted second generated image by inverting a brightness of the second generated image;
        separating a subject and background of the inverted second generated image;
        blurring the separated background of the inverted second generated image; and
        combining the third image with the blurred separated background into a final generated image.

2. The apparatus of claim 1, wherein the first image is generated after a first input signal is received via a shutter-release button and immediately before a second input signal is received via the shutter-release button.

3. The apparatus of claim 2, wherein the second image photographed with the flash being on and the third image photographed with the flash being off are generated together when the second input signal is received one time via the shutter-release button.

4. The apparatus of claim 3, wherein the digital signal processor comprises:
    a comparing unit for comparing the difference in brightness information between the first image and the second image to generate a fourth image in which the difference in brightness information is generated and for comparing the difference in brightness information between the third image and the fourth image to generate a fifth image in which the difference in brightness information is generated;
    an inversion unit for inverting the brightness information of the fifth image;
    a blurring unit for blurring the inverted fifth image by using a low pass filter; and
    a combining unit for combining the subject of the third image with the blurred fifth image.

5. The apparatus of claim 3, wherein the digital signal processor further comprises a buffer for storing the first through fifth images therein in a first in first out form.

6. The apparatus of claim 3, wherein the digital signal processor further comprises a flash controller for controlling on and off states of the flash in order to photograph the first and second images when the second input signal is received via the shutter-release button.

7. The apparatus of claim 4, wherein the inversion unit separates a subject region and a background region from the fifth image.

8. The apparatus of claim 7, wherein the blurring unit masks the subject region separated from the fifth image.

9. An apparatus for blurring a background of an image in a digital image processing device, the apparatus comprising:
    a buffer for storing first, second, and third images therein, the first image being generated after a first input signal is received via the shutter-release button and before a second input signal is received via the shutter-release button, the second image being photographed with a flash being on when the second input signal is received one time via the shutter-release button, and the third image being photographed with the flash being off;
    a comparing unit for comparing the difference in brightness information between the first image and the second image to generate a fourth image in which the difference in brightness information is generated and comparing the difference in brightness information between the third image and the fourth image to generate a fifth image in which the difference in brightness information is generated;
    an inversion unit for inverting the brightness information of the fifth image;
    a blurring unit for blurring the inverted fifth image by using a low pass filter; and
    a combining unit for combining the subject of the third image with the blurred fifth image.

10. The apparatus of claim 9, wherein the buffer stores the fourth and fifth images, in addition to the first through third images, in a first in first out form.

11. The apparatus of claim 9, further comprising a flash controller for controlling on and off of the flash in order to photograph the first and second images when second inputting the shutter-release button.

12. A method of blurring a background of an image in a digital image processing device, the method comprising:
    (a) creating:
        (a-1) a first image generated after a first input signal is received via a shutter-release button and before a second input signal is received via the shutter-release button;
        (a-2) a second image photographed with a flash being on when the second input signal is received one time; and
        (a-3) a third image photographed with the flash being off;
    (b) generating a first generated image generated by a difference in brightness between the first image and the second image;
    (c) generating a second generated image by generating a difference in brightness between the third image and the first generated image;
    (d) generating an inverted second generated image by inverting a brightness of the second generated image;
    (e) separating a subject and background of the inverted second generated image;
    (f) blurring the separated background of the inverted second generated image to produce a blurred image; and
    (g) combining a subject of the third image with the blurred image.

13. The method of claim 12, wherein the first image is generated after a first input signal is received via a shutter-release button and immediately before a second input signal is received via the shutter-release button and the second and third images are generated with the flash being respectively on and off after the second input signal is received via the shutter-release button.

14. The method of claim 12, wherein (b) comprises:
   (b-1) comparing the difference in brightness information between the first image and the second image to generate a fourth image in which the difference in brightness information is generated;
   (b-2) comparing the difference in brightness information between the third image and the fourth image to generate a fifth image in which the difference in brightness information is generated;
   (b-3) inverting the brightness information of the fifth image; and
   (b-4) blurring the fifth image, in which the brightness information is inverted, by using a low pass filter.

15. The method of claim 14, further comprising separating a subject region and a background region from the fifth image after (b-3).

16. The method of claim 15, wherein (b-4) comprises masking the subject region separated from the fifth image in which the brightness information is inverted and applying a low pass filter to the separated background region.

17. A non-transitory tangible computer-readable medium storing instructions that, when executed, cause a machine to at least carry-out the method of claim 12.

18. A method of blurring a background of an image in a digital image processing device, the method comprising:
   (a) generating first, second, and third images in the digital image processing device, the first image being generated after a first input signal is received via the shutter-release button and before a second input signal is received via the shutter-release button, the second image being photographed with a flash being on when the second input signal is received one time via the shutter-release button, and the third image being photographed with the flash being off;
   (b) comparing the difference in brightness information between the first image and the second image to generate a fourth image in which the difference in brightness information is generated;
   (c) comparing the difference in brightness information between the third image and the fourth image to generate a fifth image in which the difference in brightness information is generated and inverting the brightness information of the fifth image;
   (d) separating a subject region and a background region from the fifth image in which the brightness information is inverted and blurring the separated background region by low pass filtering the background region; and
   (e) combining the subject of the third image with the blurred fifth image.

* * * * *